United States Patent
Murphy et al.

(10) Patent No.: US 7,806,275 B2
(45) Date of Patent: Oct. 5, 2010

(54) CHLORINE RESISTANT POLYAMIDES AND MEMBRANES MADE FROM THE SAME

(75) Inventors: Andrew Patrick Murphy, Littleton, CO (US); Balasingam Murugaverl, Golden, CO (US); Robert Lee Riley, La Jolla, CA (US)

(73) Assignees: The United States of America as represented by the Secretary of the Interior, The Bureau of Reclamation, Washington, DC (US); Colorado Seminary, Denver, CO (US); Separation Systems Technology Inc., San Diego, CA (US)

( * ) Notice: Subject to any disclaimer, the term of this patent is extended or adjusted under 35 U.S.C. 154(b) by 640 days.

(21) Appl. No.: 11/746,140

(22) Filed: May 9, 2007

(65) Prior Publication Data

US 2008/0277333 A1 Nov. 13, 2008

(51) Int. Cl.
*B01D 29/46* (2006.01)
*B01D 39/00* (2006.01)
*B01D 61/00* (2006.01)

(52) U.S. Cl. .............. 210/500.38; 210/500.37; 210/490; 210/321.6; 210/321.74; 427/244; 427/245

(58) Field of Classification Search ............ 210/500.27, 210/490, 500.37, 500.38, 321.6, 321.74; 427/244, 245
See application file for complete search history.

(56) References Cited

U.S. PATENT DOCUMENTS

| | | | |
|---|---|---|---|
| 3,878,109 A | 4/1975 | Ikeda et al |  |
| 3,993,625 A | 11/1976 | Kurihara et al. |  |
| 4,217,227 A | 8/1980 | Elfert et al. |  |
| 4,259,183 A | 3/1981 | Cadotte |  |
| 4,277,344 A | 7/1981 | Cadotte |  |
| 4,529,646 A | 7/1985 | Sundet |  |
| 4,606,943 A | 8/1986 | Rak et al. |  |
| 4,661,254 A | 4/1987 | Zupancic et al. |  |
| 4,739,103 A * | 4/1988 | Hansen et al. | 560/125 |
| 4,761,234 A | 8/1988 | Uemura et al. |  |
| 4,772,394 A | 9/1988 | Swedo et al. |  |
| 4,812,238 A | 3/1989 | Cadotte et al. |  |
| 4,830,885 A | 5/1989 | Tran et al. |  |
| 4,859,384 A | 8/1989 | Fibiger et al. |  |

(Continued)

FOREIGN PATENT DOCUMENTS

EP 0 085 111 8/1983

OTHER PUBLICATIONS

The International Bureau of WIPO, Patent Cooperation Treaty, International Preliminary Report on Patentability, International Application No. PCT/US2008/052919, Nov. 10, 2009.

*Primary Examiner*—Ana M Fortuna
(74) *Attorney, Agent, or Firm*—Stites & Harbison PLLC; Stephen J. Weyer (57) ABSTRACT

A chlorine resistant polyamide is formed from the reaction product of an amine and an acid chloride monomer wherein the acid chloride monomer is modified with electron-withdrawing groups that exhibit sufficient activity to (i) minimize any chlorination on both the amine and acid chloride side and (ii) minimize N-chlorination. A membrane is made from the polyamide and, in one application, the membrane is used in a desalination unit.

20 Claims, 2 Drawing Sheets

U.S. PATENT DOCUMENTS

| | | |
|---|---|---|
| 4,876,009 A | 10/1989 | McCray |
| 4,885,091 A | 12/1989 | Swedo et al. |
| 4,888,116 A | 12/1989 | Cadotte et al. |
| 4,913,816 A | 4/1990 | Waite |
| 4,950,404 A | 8/1990 | Chau |
| 4,960,517 A | 10/1990 | Cadotte |
| 5,015,380 A | 5/1991 | Sundet |
| 5,085,777 A * | 2/1992 | Arthur .................. 210/500.38 |
| 5,234,595 A * | 8/1993 | DiGregorio et al. ......... 210/605 |
| 5,271,843 A | 12/1993 | Chau et al. |
| 5,582,725 A | 12/1996 | McCray et al. |
| 5,658,460 A | 8/1997 | Cadotte et al. |
| 5,693,227 A * | 12/1997 | Costa ........................ 210/650 |
| 5,693,231 A | 12/1997 | Johnson et al. |
| 5,876,602 A | 3/1999 | Jons et al. |
| 5,922,104 A | 7/1999 | Park et al. |
| 6,406,626 B1 | 6/2002 | Murakami et al. |
| 7,081,202 B2 | 7/2006 | Ohara et al. |
| 7,384,552 B2 * | 6/2008 | Calundann et al. ..... 210/500.38 |
| 2003/0183576 A1 | 10/2003 | Ohara et al. |

* cited by examiner

CHLORINE RESISTANT POLYAMIDES AND MEMBRANES MADE FROM THE SAME

FIELD OF THE INVENTION

The present invention relates to chlorine resistant polymers and to membranes made from such polymers such as are used, for example, as desalting membranes for water treatment systems.

BACKGROUND OF THE INVENTION

Presently, the desalting membrane of choice worldwide is the polyamide (PA) membrane. In general, PA membranes are made by forming a thin PA film on the finely porous surface of a polysulfone (PS) supporting membrane by an interfacial reaction between the reactant pair trimesoyl chloride (TMS) and m-phenylenediamine (MPD). The following equation illustrates the chemical formation of the PA desalination barrier.

In this equation, the first term represents m-phenylenediamine in water, the second term represents the trimesoyl chloride in hydrocarbon, and the resultant term represents the fully aromatic polyamide thin film. This is the equation for the PA thin-film composite membrane developed by Cadotte and others (see, e.g., J. E. Cadotte, J. J. Peterson, R. E. Larson and E. E. Erickson, "A new thin-film composite seawater reverse osmosis membrane," Desalination, 32, 25-31 (1980)) and, as indicated above, is the membrane in common use throughout the world.

A great need exists to improve the stability of the present state-of-the-art membranes used for chlorine disinfection. Such improvement is critical for Reverse Osmosis (RO) plants operating on wastewaters, surface waters and open seawater intakes wherein disinfection by chlorination is required to control the growth of microorganisms (so-called "biofouling") on the surface of the membrane. These PA membranes are so susceptible to deterioration by chlorine that dechlorination is required when chlorine is used as a disinfectant in the pretreatment. It will be understood that dechlorination prior to the PA membrane creates additional costs and effectively nullifies disinfection on the membrane surface where disinfection is needed. It is also noted that such dechlorination does not neutralize all chlorine, and the small amount of residual chlorine shortens membrane life.

It will be appreciated that there is a serious need for a chlorine-resistant PA membrane since such membrane would have significantly increased life, would prevent biofouling and lower the overall cost of desalting. In spite of claims by some manufacturers that their membranes last longer than competitive membranes in low concentrations of chlorine, it has been found that all of these PA membranes degrade and lack chemical stability to oxidants such as chlorine. However, as indicated above, chlorine is very effective biocide in water treatment and thus its use is quite desirable. If a truly effective chlorine resistant membrane could be provided, desalting plants and mobile desalting units could operate in a more robust manner, while decreasing costs of membrane cleaning, storage and replacement and of general overall operations.

SUMMARY OF THE INVENTION

According to one aspect of the invention, an acid chloride monomer such as that discussed above is modified by the addition of certain chemical groups to produce a chlorine resistant polyamide. Further, and quite importantly, a resultant membrane employing this polyamide is provided which, in addition to being chlorine resistant, has very desirable transport properties as discussed in more detail below. In general, one aspect of the invention involves modifying the acid side, i.e., the acid chloride, with electron-withdrawing groups that are active enough to minimize ring chlorination on both the amine and acid and to also minimize N-chlorination.

According a further aspect of the invention, there is provided a chlorine resistant polyamide comprising the reaction product of an amine and an acid chloride monomer wherein the acid chloride monomer is modified with electron-withdrawing groups that exhibit sufficient activity to (i) minimize any chlorination on both the amine and acid chloride side and (ii) minimize N-chlorination.

In one preferred embodiment, the acid chloride monomer comprises monofluorotrimesoyl chloride.

In another preferred embodiment, the acid chloride monomer comprises perfluorotrimesoyl chloride.

In yet another preferred embodiment, the acid chloride monomer comprises nitrotrimesoyl chloride.

In a further preferred embodiment, the acid chloride monomer comprises perchlorotrimesoyl chloride.

In another preferred embodiment, the acid chloride monomer comprises 1,3,5-benzenetri-(difluoroacetoyl chloride).

Different amines may be used and in one embodiment, the amine comprise m-phenylenediamine.

In a further embodiment, the amine comprises 1,3,5-triaminobenzene.

In yet another embodiment, the amine comprises 1,2,4,5-tetraaminobenzene.

In a further embodiment, the amine comprises 1,2,3,4-tetraaminocyclohexane.

In another embodiment, the amine comprises tetrakis (aminomethyl) methane.

In yet another embodiment, the amine comprises a mixture of two or more of the foregoing amines.

In accordance with a further aspect of the invention there is provided a chlorine resistant membrane including a chlorine resistant polyamide comprising the reaction product of an amine and an acid chloride monomer wherein the acid chloride monomer is modified with electron-withdrawing groups that exhibit sufficient activity to (i) minimize any chlorination on both the amine and acid chloride side and (ii) minimize N-chlorination.

As set forth above for the polyamide, in one preferred embodiment the acid chloride monomer comprises monofluorotrimesoyl chloride, while in other preferred embodiments, the acid chloride monomer comprises perfluorotrimesoyl chloride or nitrotrimesoyl chloride or perchlorotrimesoyl chloride or 1,3,5-benzenetri-(difluoroacetoyl chloride).

Also as set forth above, the amine preferably comprises an amine selected from the group consisting of m-phenylenediamine, 1,3,5-triaminobenzene, 1,2,4,5-tetraaminobenzene, 1,2,3,4-tetraaminocyclohexane, tetrakis (aminomethyl) methane, and mixtures thereof.

According to a further aspect of the invention, there is provided a reverse osmosis desalination unit comprising a membrane support and, mounted on the membrane support, a chlorine resistant membrane including a chlorine resistant polyamide comprising the reaction product of an amine and an acid chloride monomer wherein the acid chloride monomer is modified with electron-withdrawing groups that exhibit sufficient activity to (i) minimize any chlorination on both the amine and acid chloride side and (ii) minimize N-chlorination.

As set forth above, the acid chloride monomer preferably comprises one of monofluorotrimesoyl chloride, perfluorotrimesoyl chloride, nitrotrimesoyl chloride, perchlorotrimesoyl chloride, and 1,3,5-benzenetri-(difluoroacetoyl chloride).

As was also set forth above, the amine preferably comprises an amine selected from the group consisting of m-phenylenediamine, 1,3,5-triaminobenzene, 1,2,4,5-tetraaminobenzene, 1,2,3,4-tetraaminocyclohexane, tetrakis (aminomethyl) methane, and mixtures thereof.

In accordance with a further aspect of the invention, there is provided a chlorine resistant polyamine comprising the reaction product of an amine and an acid chloride selected from the group consisting of monofluorotrimesoyl chloride, perfluorortrimesoyl chloride, nitrotrimesoyl chloride, perchlorotrimesoyl chloride and 1,3,5-benzenetri-(difluoroacetoyl chloride). In one preferred embodiment, the acid chloride comprises monofluorotrimesoyl chloride.

Preferably, the amine is selected from the group consisting of m-phenylenediamine, 1,3,5-triaminobenzene, 1,2,4,5-tetraaminobenzene, 1,2,3,4-tetraaminocyclohexane, tetrakis (aminomethyl) methane, and mixtures thereof.

According to yet another aspect of the invention, there is provided a chlorine resistant membrane including a chlorine resistant polyamide comprising the reaction product of an amine and an acid chloride selected from the group consisting of monofluorotrimesoyl chloride, perfluorortrimesoyl chloride, nitrotrimesoyl chloride, perchlorotrimesoyl chloride and 1,3,5-benzenetri-(difluoroacetoyl chloride). In one preferred embodiment, the acid chloride comprises monofluorotrimesoyl chloride.

Preferably, the amine is selected from the group consisting of m-phenylenediamine, 1,3,5-triaminobenzene, 1,2,4,5-tetraaminobenzene, 1,2,3,4-tetraaminocyclohexane, tetrakis (aminomethyl) methane, and mixtures thereof.

According to a further aspect of the invention, there is provided a reverse osmosis desalination unit comprises a membrane support and, supported on the membrane support, a chlorine resistant membrane comprising the reaction product of an amine and an acid chloride selected from the group consisting monofluorotrimesoyl chloride, perfluorotrimesoyl chloride, nitrotrimesoyl chloride, perchlorotrimesoyl chloride and 1,3,5-benzenetri-(difluoroacetoyl chloride). In one preferred embodiment, the acid chloride comprise monofluorotrimesoyl chloride.

As above, the acid chloride preferably comprises the amine selected from the group consisting of m-phenylenediamine, 1,3,5-triaminobenzene, 1,2,4,5-tetraaminobenzene, 1,2,3,4-tetraaminocyclohexane, tetrakis (aminomethyl) methane and mixtures thereof.

Further features and advantages of the present invention will be set forth in, or apparent from, the detailed description of preferred embodiments thereof which follows.

DESCRIPTION OF THE PREFERRED EMBODIMENTS

As indicated above, generally speaking, one aspect of the invention concerns modifying the acid chloride (TMC) of a TMC/MPD polyamide with electron-withdrawing groups that are reactive enough to minimize ring chlorination on both the acid (TMC) and amine (MPD) side and to minimize N-chlorination as well. In addition, to electron-withdrawing, these chemical groups must have the correct p orbitals or π system for resonance to occur, must be spatially small in size so they do not interfere in the polymerization process, must be non-ionizing (thus resulting in changes to the acid chloride compound favorable regarding solubility in hexane), and must be fairly straightforward to synthesize from commercially available precursors so the final cost of the compound is not unfavorable.

The five compounds described below have been found to be effective. The first is represented as follows:

This compound is monofluorotrimesoyl chloride (MFTMC), and is not available commercially, but has been synthesized by the applicants. Based on current studies, this is a preferred embodiment of the chemical groups.

A further useful compound is represented as follows:

This compound is perfluorotrimesoyl chloride (PFTMC), and is not available commercially.

A third compound is represented as follows:

This compound is nitrotrimesoyl chloride (NTMC) and is not available commercially.

A fourth compound is represented as follows:

This compound is perchlorotrimesoyl chloride (PCTMC), and is not available commercially.

A fifth compound is represented as follows:

This compound is 1,3,5-benzenetri-(difluoroacetoyl chloride), or BTFAC, and is not available commercially.

The first four of the above compounds have in common the TMC molecule with electron-withdrawing from fluoro, chloro or nitro groups. The last compound may also be effective for the reasons given above. Further, in order to provide the highly cross linked polymer system, difunctional acid chlorides such as 5-fluoro-isophthalic acid chloride and tri- or tetra-functional amines may also be used. This is discussed in more detail below.

On the amine side, the industrial standard MPD may continue to be a satisfactory amine and no additional candidates may be needed. On the other hand, other amines may also be used. In this regard, the following are considered candidates for use because they are multifunctional which provides sterics and simpler acid chlorides such as 5-fluoro-isophthalic acid chloride. Also, some of the following examples do not require the aromatic ring, hence there is no N-ring chlorination. It will be understood that mixtures of the following amines may also be used.

A first example is represented as follows:

This compound is 1,3,5-triaminobenzene. The salt is available commercially and the free amine was synthesized by the applicants.

A second example is represented as follows:

This compound is 1,2,4,5-tetraaminobenzene, and is not available commercially.

Further amines are of interest in that they use an aliphatic ring system, which may prevent ring substation by chlorine.

A first amine of this type is represented as follows:

This compound is 1,2,3,4-tetraaminocyclohexane, and is not available commercially.

A second amine of this type is represented as follows:

This compound is tetrakis (aminomethyl) methane, and is not available commercially today.

As was mentioned above, these amines have more than two functional groups and thus can be used to make membranes that use a difunctional acid chloride. These acid chlorides are generally easier to synthesize.

As discussed above, the major thrust of the invention concerns modifications on the acid side of the polymer. As mentioned previously, the groups that are added to the TMC molecule are electron-withdrawing. With this approach, there may be no need to change from MPD on the amine side. This change makes practical sense for a number of reasons. In this regard, for acid chlorides, where electron withdrawing groups are added, the following has been observed: (1) it is relatively easy to obtain or synthesize di-functional or tri-functional acid chlorides; (2) there is an increase in electron-withdrawing away from the nitrogen; (3) there are no solubility problems in hexane; (4) higher reactivity occurs during interfacial polymerization; (5) data on at least two membrane systems show excellent transport properties, particularly flux; and (6) a more hydrophobic acid chloride results.

In contrast, on the amine side, when attempting to add electron-withdrawing groups, there are a number of problems, including the following: (1) difficulties in obtaining the precursors and overall synthesis; (2) an increase in electron-withdrawing away from the nitrogen; (3) resonance problems resulting in ring chlorination; (4) water solubility problems arising from the addition of hydrophobic groups; (5) less reactivity during interfacial polymerization; and (6) all successful membranes made based on the amine modification show problems with flux.

It is also noted that although the prior art discloses amines such as 5-chloro-m-phylenediamine, these amines are generally undesirable for the purposes of the present invention, for the reasons discussed above. In addition, test data shows that amides made with 5-chloro-m-phylenediamine actually degrade with chlorine. The rate of degradation may be less than with the MPD, which may improve membrane life in chlorinated waters, but these membranes are at best only a modest improvement. As mentioned above, there are also flux problems with these 5-chloro-m-phylenediamine membranes.

Using the chemical principles described above, acid chlorides with the above-mentioned modifications could be taken from the above examples (or from others that would be obvious to the routineer chemist) and the standard amine, MPD to produce a chlorine resistant polyamide. Also, other amines could be taken from the above examples (or others that are not mentioned but would be obvious to the routineer chemist) and could be part of the successful polymer.

In the examples that follow, a new class of polyamides are discussed that are chlorine resistant. It will be appreciated that because of this chlorine resistance, applications of this polymer extend beyond membranes into many other kinds of applications for the polymer.

It will also be understood that it is not possible to predict which acid chlorides and amines can be used to make membranes and, in particular, successful membranes, and that not all acid chlorides and amines can be used to make membranes. Thus, the invention represents a quite fortuitous finding of the right combination of these acid chlorides and amines that can be used to make membranes, and not just membranes, but successful membranes with good transport properties of salt rejection and flux.

As described above, one aspect of the invention concerns modifying polyamide polymers so that they exhibit chemical stability in chlorine water environments. Because of the difficulty in obtaining chemical data from polymers, especially highly-cross linked polymer systems, Examples 1 and 2 below began with the syntheses of amides. These amides were then exposed to high concentrations of chlorinated water. It will be appreciated that these amides are the smaller units; polyamides are composed of many amide units. However, the chemical principles of these amides that have been found apply directly to polyamide polymers.

Example 1

The amides described below were synthesized and exposed to chlorinated water. It is noted that the chlorine concentrations were high to accelerate the degradation. In fact, if the actual application were RO membranes, this would be the equivalent of $1.2 \times 10^5$ or $2.4 \times 10^5$ ppm-hrs of chlorine over the period of 24 or 48 hours. These chlorine exposures are approximately what RO membranes would receive after 13.7 or 27.4 years of operation at 1.0 mg/L chlorine, and this would be well beyond the life of RO membranes currently in use. Nuclear Magnetic Resonance analysis was done using a Varian, Mercury 400 MHz instrument. Considering this example in more detail the following amides were synthesized:

These compounds were then subjected to the high concentrations of chlorine mentioned above in order to accelerate the degradation.

Nuclear Magnetic Resonance (NMR) and ATR-IR data on these samples before and after the accelerated chlorination tests show chlorine degradation on amides 2, 4 and 6. On the other hand, amides 1, 3 and 5 did not chlorinate.

It is believed that the nitro groups are electron-withdrawing because of the π bonds to the electronegative oxygen atoms. The amino groups are not electron-withdrawing and this explains why half of the above amides are chlorine resistant and the other half degrade. These changes were on the amine side. For membranes made by interfacial polymerization, the next example shows changes on the acid side.

Example 2

This example provides additional data on chlorine resistant amides.

As in the previous example, these compounds were then subjected to high concentrations of chlorine to accelerate the degradation. As discussed above, if the application were RO membranes, this would be the equivalent of $1.2 \times 10^5$ or $2.4 \times 10^5$ ppm-hrs of chlorine over the period of 24 or 48 hours, and these chlorine exposures are approximately what RO membranes would receive after 13.7 or 27.4 years of operation at 1.0 mg/L chlorine. $^1$H-NMR analysis was done using a Varian, Mercury 400 MHz instrument. All samples were dissolved in DMSO-d6 with 0.01% TMS.

In this example, the control is N-[3-(benzoylamino)phenyl]benzamide, represented below:

The following results were obtained for the NMR testing:

| Assignment | Type | Chemical shift (ppm) | Number of protons | Splitting pattern |
| --- | --- | --- | --- | --- |
| 4 | N—H | 10.39 | 2 | s |
| 1 | Ar—H | 8.9 | 1 | s |
| 6 | Ar—H | 8.04 | 4 | dd |
| 2 | Ar—H | 7.48 | 2 | dd |
| 5, 3 | Ar—H | 7.37 | 5 | m |

For chlorine-treated, 4-fluoro-N-{[3-(4-fluorobensoyl)amino]phenyl}benzamide, the following results were obtained.

| Assignment | Type | Chemical shift (ppm) | Number of protons | Splitting pattern |
| --- | --- | --- | --- | --- |
| 4 | N—H | 10.39 | 2 | S |
| 1 | Ar—H | 8.9 | 1 | S |
| 6 | Ar—H | 8.04 | 4 | Dd |
| 2 | Ar—H | 7.48 | 2 | Dd |
| 5, 3 | Ar—H | 7.37 | 5 | M |

| Assignment | Type | Chemical shift (ppm) | Number of protons | Splitting pattern |
| --- | --- | --- | --- | --- |
| 4 | N—H | 10.29 | 2 | s |
| 1 | Ar—H | 8.32 | 1 | s |
| 5 | Ar—H | 7.94 | 4 | dd |
| 2, 6, 7 | Ar—H | 7.57-7.47 | 8 | m |
| 3 | Ar—H | 7.3 | 1 | t |

For chlorine-treated, N-[3-(benzoylamino)phenyl]benzamide, the following results were obtained.

| Assignment | Type | Chemical shift (ppm) | Number of protons | Splitting pattern |
| --- | --- | --- | --- | --- |
|  | N—H | 10.45, 10.20, 10.13, 10.08 | 30% | s |
| 4 | N—H | 10.29 | 70% | s |
| 1 | Ar—H | 8.32 |  | s |
|  | Ar—H | 8.10, 8.00 |  | s, s |
| 5 | Ar—H | 7.94 |  | dd |
|  | Ar—H | 7.85, 7.75 |  | dd, dd |
| 2, 6, 7 and other | Ar—H | 7.65-7.45 |  | Altered multiple |

The NMR data indicates the molecular structure of the above amide sample under investigation has changed significantly on exposure to chlorine water. The four additional N-H signals from the exposed sample suggest that there are at least four different aromatic ring chlorinated species accounting for about 30% of the original compound.

Example 3

In this example, the control was 4-fluoro-N-{[3-(4-fluorobensoyl)amino]phenyl} benzamide, represented below:

Example 4

In this example, the control is 5-fluoro-(N,N'-diphenyl)isophthalamide, represented below:

The following results for the NMR testing were obtained for the control.

| Assignment | Type | Chemical shift (ppm) | Number of protons | Splitting pattern |
| --- | --- | --- | --- | --- |
| 3 | N—H | 10.52 | 2 | S |
| 1 | Ar—H | 8.42 | 1 | S |
| 2 | Ar—H | 8.00 | 2 | d |
| 4 | Ar—H | 7.98 | 4 | d |
| 5 | Ar—H | 7.38 | 4 | t |
| 6 | Ar—H | 7.13 | 2 | t |

For the chlorine treated, 5-fluoro-(N,N'-diphenyl)isophthalamide, the NMR testing produced the following results:

| Assignment | Type | Chemical shift (ppm) | Number of protons | Splitting pattern |
|---|---|---|---|---|
| 3 | N—H | 10.52 | 2 | s |
| 1 | Ar—H | 8.42 | 1 | s |
| 2 | Ar—H | 8.00 | 2 | d |
| 4 | Ar—H | 7.98 | 4 | d |
| 5 | Ar—H | 7.38 | 4 | t |
| 6 | Ar—H | 7.13 | 2 | t |

The NMR data clearly indicates that the amide under investigation is unaffected by chlorine.

Example 5

In this example, the control was 2,4,5,6-tetrafluoro-(N,N'-diphenyl)isophthalamide, represented below:

The NMR testing produced the following results:

| Assignment | Type | Chemical shift (ppm) | Number of protons | Splitting pattern |
|---|---|---|---|---|
| 1 | N—H | 11.00 | 2 | s |
| 2 | Ar—H | 7.67 | 4 | d |
| 3 | Ar—H | 7.390 | 4 | t |
| 4 | Ar—H | 7.17 | 2 | t |

The following results were obtained for Cl-treated, 2,4,5,6-tetrafluoro-(N,N'-diphenyl)isophthalamide.

| Assignment | Type | Chemical shift (ppm) | Number of protons | Splitting pattern |
|---|---|---|---|---|
| 1 | N—H | 11.00 | 2 | s |
| 2 | Ar—H | 7.67 | 4 | d |
| 3 | Ar—H | 7.390 | 4 | t |
| 4 | Ar—H | 7.17 | 2 | t |

Again, the NMR data shows that this particular amide is not affected by chlorine.

It is believed to be evident from the foregoing Examples 2 to 6 that the invention is not limited to these specific chlorine resistant amides and can be extended to other polyamide polymers that would be chlorine resistant given that the same chemical principles discussed above would be involved. As discussed above, the changes made to the amides in these examples are on the acid side.

As mentioned above, the discovery that membranes can be made from at least one of the examples is highly significant. Using the polymer system composed of monofluorotrimesoyl chloride (MFTMC) and m-phenylenediamine (MPD), the inventors were able to make use of the chemical principle of providing sufficient electron-withdrawing from the acid to the amide bond and the amine. This electron-withdrawing effectively deactivates the nitrogen so as to prevent N-chlorination and ring chlorination. This makes possible a modification that is relatively easy to synthesize, allows sufficient solubility in the organic phase during interfacial polymerization, provides a higher reactivity during interfacial polymerization, and achieves most of all the desired transport properties.

An example will now be considered of membranes made from MFTMC and MPD, demonstrating the good transport properties of such membranes.

Example 6

A MFTTMC and MPD membrane was tested and was found to have good transport properties on seawater (13.1 gpd and 98.4% salt rejection). The results are set forth below.

| Row No. | Membrane ID | Solution A, amine/water solution, (pH) | Solution A, amine/water solution (Conc. wt-%) | Solution B, acid chloride/hexane solution (Conc. wt-%) | Reverse osmosis performance | |
|---|---|---|---|---|---|---|
| | | | | | Water flux (gfd) | rejection (%) |
| 2. | BBCR-1219-5FTMC | — | 4 wt-% MPD | MFTMC = 0.15% | 13.1 | 98.4 |

This result is very promising. Moreover, these transport properties are expected to improve in time with improvements in, i.e., modifications to, the monomer purity and casting techniques.

A further example will be considered below which provides long-term field test data in connection with the membranes.

Example 7

Figure 1:
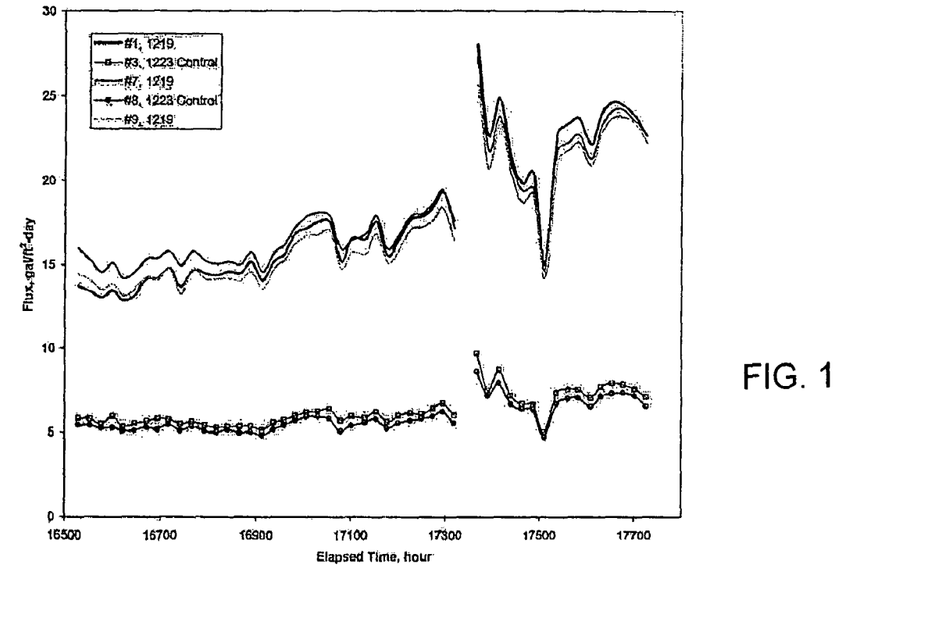
FIGS. 1 and 2 are graphs used in comparing the water flux and salt rejection characteristics, respectively, of membranes constructed in accordance with one aspect of the invention with prior art reference membranes or controls.
Figure 2:
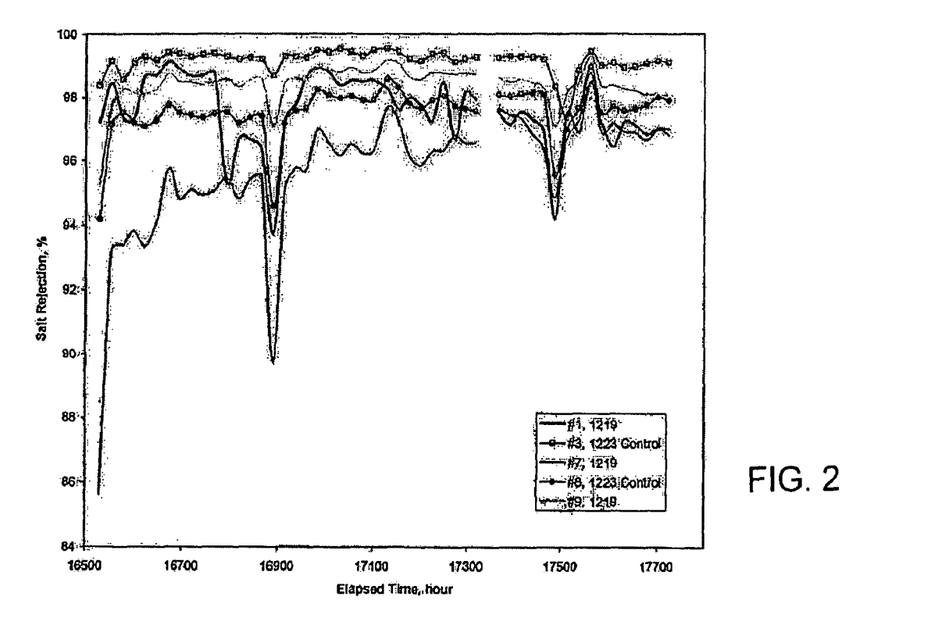

In the following example, the tests results provide a comparison of the MFTMC and MPD membranes with commercial controls. FIG. 1 is a plot of water flux as a function of time while FIG. 2 is a plot of salt rejection as a function of time.

In FIG. 1, #3 and #8 are commercial controls made with the standard TMC/MPD monomers. All of the other data is for the MFTMC/MPD membranes. While the flux and salt rejection remains relatively constant for the controls over this period, the expected decrease in salt rejection, and either an increase or decrease in flux for the controls, can be expected in the months ahead. The MTFTMC and MPD membranes continue to provide a salt barrier over these months similar to the controls. Further, these membranes show higher flux than the controls and one of the membranes shows an increase in salt rejection over this period.

Other successful membranes were made from the class of compounds described above.

Example 8

In this example, the following membrane system was made which is based on the above principles:

The tetra amine provides the needed cross-linking with the difunctional acid chloride. Also, the non-aromatic amine prevents ring chlorination and the electron-withdrawing from the acid side stops amide nitrogen chlorination. A first membrane was produced having good transport properties on seawater (19.3 gpd and 98.7% salt rejection). A second membrane had even better flux as indicated:

the acid chloride group, the acid side of the polymer will withdraw electrons away from the amide nitrogen atom thereby creating chlorine resistance. Of course, this adjustment can be made on all acid chloride groups per ring.

Further, acid chlorides could be made from aliphatic rings systems that are 3,4,5,6, or 7 carbon units in size. Below are two examples.

In these acid chlorides, the electron withdrawing function would be achieved by induction away from the amide nitrogen atom to thereby create chlorine resistance. The ring(s) could be partially substituted with "X" or fully substituted.

Although the focus in the principal examples set forth above is on synthesizing and purifying cis, trans, cis, trans cyclopentanetetracarboxylic acid chloride, using the just described approach, a single fluoro group could be added anywhere on the ring system to create chlorine resistance.

| Row No. | Membrane ID | Solution A, amine/water solution, (pH) | Solution A, amine/water solution (Conc. wt-%) | Solution B, acid chloride/hexane solution (Conc. wt-%) | Reverse osmosis performance | |
|---|---|---|---|---|---|---|
| | | | | | Water flux (gfd) | rejection (%) |
| 3. | BBCR-1207-237-5NIPCAC | — | 4 wt-% tetrakis (aminomethyl) methane | 5-nitro-isophthalic acid chloride = 0.15% | 22.2 | 98.3 |

The excellent results produced are highly significant and quite unexpected, i.e., it would not be expected that the membrane would exhibit both strong chlorine resistance and good flux. Tetrakis (methylamino methyl) methane can also be used.

In the examples discussed above, electron-withdrawing groups are located on the 6-member aromatic ring system of the acid chloride molecule and an amines such as the industrial standard MPD is used. These are preferred embodiments. However, it will be understood that polyamines and, in particular, polyamines containing aminobenzene would also be included. Moreover, as indicated previously, there are other examples that fall within the scope of the invention and others that may do so. Consider the following figure:

If "X" represents an electron withdrawing group, then by substituting one or both of the hydrogen(s) on the above methylene group between the acid chloride ring system and However, it may be necessary to have more than one such group, or to completely substitute all the hydrogen on the ring with fluorine.

Methylene groups between the ring(s) and acid chloride groups may also be useful in creating chlorine resistance. This is a similar approach that follows from the first example.

A non-ring based acid chloride is another candidate. The following example is of interest:

In membrane applications, membranes have been made using tetrakis (aminomethyl)methane as an amine with a similar structure.

As will be apparent from the foregoing, one key aspect of the invention concerns electron-withdrawing away from the amide nitrogen by modifying the acid chloride molecule with electron-withdrawing groups. A number of monomers have been identified that result in, or can be predicted to result in, membranes with desirable transport properties.

Figure 3:
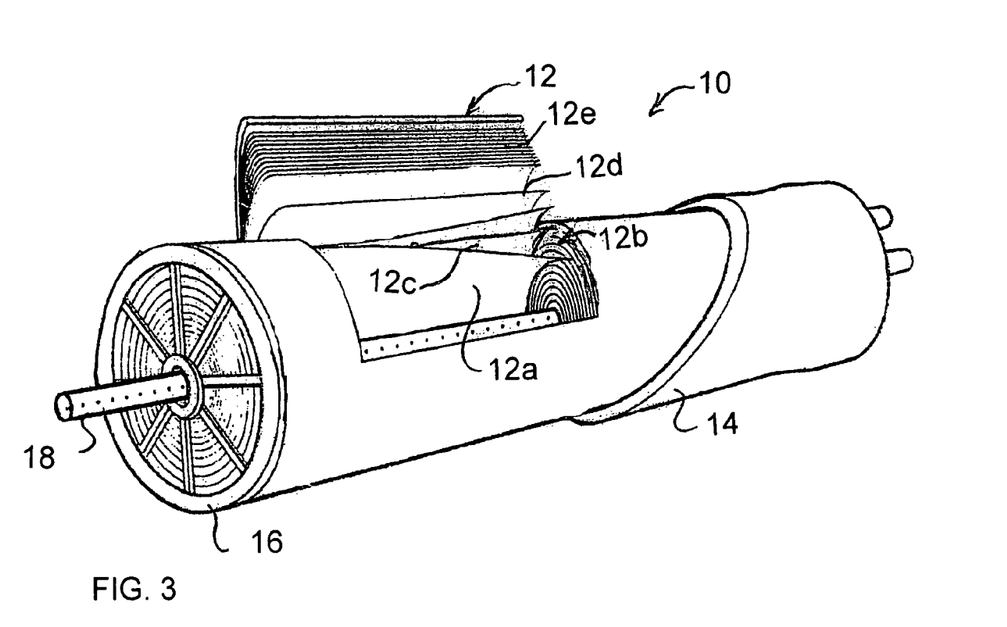
FIG. 3 is a perspective view of a desalination membrane unit.

Although as discussed above, and as is also discussed below, the invention has many different applications, one important application is in the manufacture of reverse osmosis (RO) membranes. Referring to FIG. 3, a spiral-wound RO membrane unit 10 is shown which is typical of those currently used in desalting plants. The unit 10 includes a membrane element 12 which is constructed in accordance with the present invention. Because element 10 is conventional apart from membrane 12 (and moreover, in this regard, the external physical appearance of membrane 12 would not be different for a conventional membrane), unit 10 will be only briefly described below by way of background. It will also be understood that membranes made by the methods of the present invention can be used in different membrane units than that shown in FIG. 1.

The unit 10 includes an outer pressure vessel 14 typically made of fiberglass with an antitelescoping device or shell 16 at opposite ends thereof. An axially extending product tube 18 is located centrally of element 10, as shown. The membrane element 12 itself includes a salt rejecting membrane surface 12a which forms part of a membrane leaf 12b including a tricot spacer 12c, a mesh spacer 12d and a membrane 12e. It will be appreciated that the membrane element 12 is the key component of unit 10 and defines the actual surface where salt is separated from water. In embodiments of the invention, the membrane would be made from a chlorine resistant PA polymer, as described above.

It will be appreciated that chlorine resistant PA polymers should find a wide range of application in industry. Applications could include linear and highly cross-linked polyamide polymers for the production of pipes, tanks, and the like, fibers in clothing, chemically resistant coatings, flame retardant materials (due to the fluoro groups), and chlorine resistant surfactants. Further, even in the area of membranes there is more than RO, and filtering processes such as microfiltration (MF), nanofiltration (NF), and ultrafiltration (UF) could all benefit from PA polymers having improved chlorine resistance.

Although the invention has been described above in relation to preferred embodiments thereof, it will be understood by those skilled in the art that variations and modifications can be effected in these preferred embodiments without departing from the scope and spirit of the invention.

What is claimed is:

1. A chlorine resistant membrane including a chlorine resistant polyamide comprising a chlorine resistant polyamide comprising the reaction product of an amine and an acid chloride monomer wherein the acid chloride monomer is modified with electron-withdrawing groups that exhibit sufficient activity to (i) minimize any chlorination on both the amine and acid chloride side and (ii) minimize N-chlorination.

2. A membrane as claimed in claim 1 wherein the acid chloride monomer comprises monofluorotrimesoyl chloride.

3. A membrane as claimed in claim 1 wherein the acid chloride monomer comprises perfluorotrimesoyl chloride.

4. A membrane as claimed in claim 1 wherein the acid chloride monomer comprises nitrotrimesoyl chloride.

5. A membrane as claimed in claim 1 wherein the acid chloride monomer comprises perchlorotrimesoyl chloride.

6. A membrane as claimed in claim 1 wherein the acid chloride monomer comprises 1,3,5-benzenetri-(difluoroacetoyl chloride).

7. A membrane as claimed in claim 1 wherein the amine comprises an amine selected from the group consisting of m-phenylenediamine, 1,3,5-triaminobenzene, 1,2,4,5-tetraaminobenzene, 1,2,3,4-tetraaminocyclohexane, tetrakis (aminomethyl)methane, tetrakis (methylaminomethyl)methane, and mixtures thereof.

8. A reverse osmosis desalination unit comprising a membrane support and, mounted on the membrane support, a chlorine resistant membrane including a chlorine resistant polyamide comprising the reaction product of an amine and an acid chloride monomer wherein the acid chloride monomer is modified with electron-withdrawing groups that exhibit sufficient activity to (i) minimize any chlorination on both the amine and acid chloride side and (ii) minimize N-chlorination.

9. A desalination unit as claimed in claim 8 wherein the acid chloride monomer comprises monofluorotrimesoyl chloride.

10. A desalination unit as claimed in claim 8 wherein the acid chloride monomer comprises perfluorotrimesoyl chloride.

11. A desalination unit as claimed in claim 8 wherein the acid chloride monomer comprises nitrotrimesoyl chloride.

12. A desalination unit as claimed in claim 8 wherein the acid chloride monomer comprises perchlorotrimesoyl chloride.

13. A desalination unit as claimed in claim 8 wherein the acid chloride monomer comprises 1,3,5-benzenetri-(difluoroacetoyl chloride).

14. A desalination unit as claimed in claim 8 wherein the amine comprises an amine selected from the group consisting of m-phenylenediamine, 1,3,5-triaminobenzene, 1,2,4,5-tetraaminobenzene, 1,2,3,4-tetraaminocyclohexane, tetrakis (aminomethyl)methane, tetrakis (methylaminomethyl)methane, and mixtures thereof.

15. A chlorine resistant membrane including a chlorine resistant polyamide comprising the reaction product of an amine and an acid chloride selected from the group consisting of monofluorotrimesoyl chloride, perfluorotrimesoyl chloride, nitrotrimesoyl chloride, perchlorotrimesoyl chloride and 1,3,5-benzenetri-(difluoroacetoyl chloride).

16. A membrane as claimed in claim 15 wherein the acid chloride comprises monofluorotrimesoyl chloride.

17. A membrane as claimed in claim 15 wherein the amine is selected from the group consisting of m-phenylenediamine, 1,3,5-triaminobenzene, 1,2,4,5-tetraaminobenzene, 1,2,3,4-tetraaminocyclohexane, tetrakis (aminomethyl)methane, tetrakis (methylaminomethyl)methane, and mixtures thereof.

18. A reverse osmosis desalination unit comprises a membrane support and, supported on the membrane support, a chlorine resistant membrane comprising the reaction product of an amine and an acid chloride selected from the group consisting of monofluorotriesoyl chloride, perfluorotrimesoyl chloride, nitrotrimesoyl chloride, perchlorotriesoyl chloride and 1,3,5-benzenetri-(difluoroacetoyl chloride).

19. A unit as claimed in claim 18, wherein said acid chloride comprises monofluorotrimesoyl chloride.

20. A unit as claimed in claim 18 wherein said acid chloride comprises the amine selected from the group consisting of m-phenylenediamine, 1,3,5-triaminobenzene, 1,2,4,5-tetraaminobenzene, 1,2,3,4-tetraaminocyclohexane, tetrakis (aminomethyl)methane, tetrakis (methylaminomethyl)methane, and mixtures thereof.

* * * * *